United States Patent
Cerwall et al.

[11] Patent Number: 6,032,047
[45] Date of Patent: Feb. 29, 2000

[54] METHOD FOR CHANGING BCCH CARRIER FREQUENCY WITHOUT DISTURBING ONGOING CALL TRAFFIC

[75] Inventors: Carl Patrik Cerwall, Tyresö ; Stig Roland Bodin, Spånga, both of Sweden

[73] Assignee: Telefonaktiebolaget L/M Ericsson (publ), Sweden

[21] Appl. No.: 08/918,370

[22] Filed: Aug. 26, 1997

[51] Int. Cl.[7] .................................................. H04Q 7/22
[52] U.S. Cl. .......................... 455/450; 455/434; 455/561
[58] Field of Search ................................... 455/403, 422, 455/446–447, 450–452, 434, 509, 511, 515, 524–525, 561

[56] References Cited

U.S. PATENT DOCUMENTS

| | | | |
|---|---|---|---|
| 5,235,598 | 8/1993 | Sasuta | 455/511 X |
| 5,491,644 | 2/1996 | Pickering et al. | 455/524 X |
| 5,546,384 | 8/1996 | Dupuy et al. | 370/50 |
| 5,638,372 | 6/1997 | Lindqvist | 370/336 |
| 5,732,353 | 3/1998 | Haartsen | 455/450 |
| 5,864,764 | 1/1999 | Thro et al. | 455/561 |
| 5,875,399 | 2/1999 | Kallin et al. | 455/434 |
| 5,887,156 | 3/1999 | Subramanian et al. | 395/500 |

FOREIGN PATENT DOCUMENTS

| | | |
|---|---|---|
| WO 95/19687 | 7/1995 | WIPO . |
| WO 95/ | 11/1995 | WIPO . |
| WO 95/34957 | 12/1995 | WIPO . |

OTHER PUBLICATIONS

European Patent Office, Standard Search Report, May 28, 1998, File RS 100139 US.

*Primary Examiner*—William G. Trost
*Attorney, Agent, or Firm*—Jenkens & Gilchrist, P.C.

[57] ABSTRACT

A method for establishing a new broadcast control channel carrier frequency within a cell without disturbing ongoing call traffic is disclosed. A cell having a base station transmitting broadcast control channel data over an existing BCCH carrier frequency establishes a second BCCH carrier frequency within the cell. During a first time period BCCH data is transmitted on the existing first BCCH carrier frequency. During a second time period, both the existing and new BCCH carrier frequencies carry BCCH data to enable surrounding mobile stations to detect and recognize both carriers. The transmission of the old BCCH carrier frequency is then discontinued during a third time period, such that the broadcast control channel data is only transmitted on the new BCCH carrier frequency.

16 Claims, 3 Drawing Sheets

METHOD FOR CHANGING BCCH CARRIER FREQUENCY WITHOUT DISTURBING ONGOING CALL TRAFFIC

BACKGROUND OF THE INVENTION

1. Technical Field of the Invention

The present invention relates to broadcast control channel (BCCH) carrier frequencies, and more particularly, to a method for changing a BCCH carrier frequency within a cell without disturbing ongoing call traffic within the cell or within neighboring cells.

2. Description of Related Art

Within cellular mobile telephone systems, there is a need from time-to-time to reconfigure the frequency plan of the system. The need for change arises from the growth of traffic within a cellular mobile telephone system that requires additional cells and/or tighter frequency reuse patterns. This causes frequency replanning to be one of the most time consuming tasks associated with the operation of mobile telephone networks. Presently, alterations to frequency reuse plans are normally performed during low traffic periods, such as at night. This is due to the fact that when the broadcast control channel (BCCH) carrier frequency is changed, the mobile stations served by the cell associated with the BCCH carrier frequency are unable to setup calls or camp on the specific cells.

While methods have been developed to change other carrier frequencies in a cell on a time-slot by time-slot basis, a similar technique has not presently been developed for changing the carrier frequencies associated with the BCCH channels. In fact, existing techniques require that time-slots altered, not be carrying the BCCH channel. The other solution involves completely disabling the BCCH carrier frequency in order to assign a new frequency. This change, as mentioned previously, is normally accomplished at night during low traffic periods. However, during this time period, nothing may be transmitted. This prevents call setup and causes all mobile stations within neighboring cells to be unable to provide signal strength measurements on the cell that is temporarily off-line. This prevents handoffs to the cell and may cause a handoff to a less suitable neighboring cell. The network could not rank an offline cell, which could potentially lead to a wrong handover decision or dropped call. Thus, there exist a need for a method enabling the changing of a BCCH carrier frequency without disturbing the call traffic presently existing on and associate with the cell in which the BCCH carrier frequency is being changed.

SUMMARY OF THE INVENTION

The present invention overcomes the foregoing and other problems with a method for establishing a new BCCH carrier frequency of a cell without disturbing ongoing call traffic within the cell and its neighbors. Initially, a second BCCH carrier frequency is established within a cell already having a first BCCH frequency transmitting therefrom. The BCCH allocation lists in neighboring cells are updated to reflect the additional BCCH carrier frequency.

The base station of the cell then begins transmitting the new BCCH carrier frequency by transmitting BCCH filler and all broadcast information (BCCH, FCCH, SCH, etc.) over a timeslot on the assigned carrier frequency. Next, the transmissions associated with the first BCCH carrier frequency are discontinued by stopping transmission of the various channels associated with the first BCCH carrier frequency in a sequenced and time-delayed manner.

By discontinuing transmission of this information, mobile stations will cease accessing and utilize the first BCCH carrier frequency. Any remaining ongoing calls may be transferred to another carrier if a system operator so desires, and the first BCCH carrier frequency is disabled. From this point on, all calls will be associated with the second BCCH carrier frequency and initiation of the second BCCH carrier frequency has been accomplished without disturbing any ongoing call traffic.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

Figure 1:
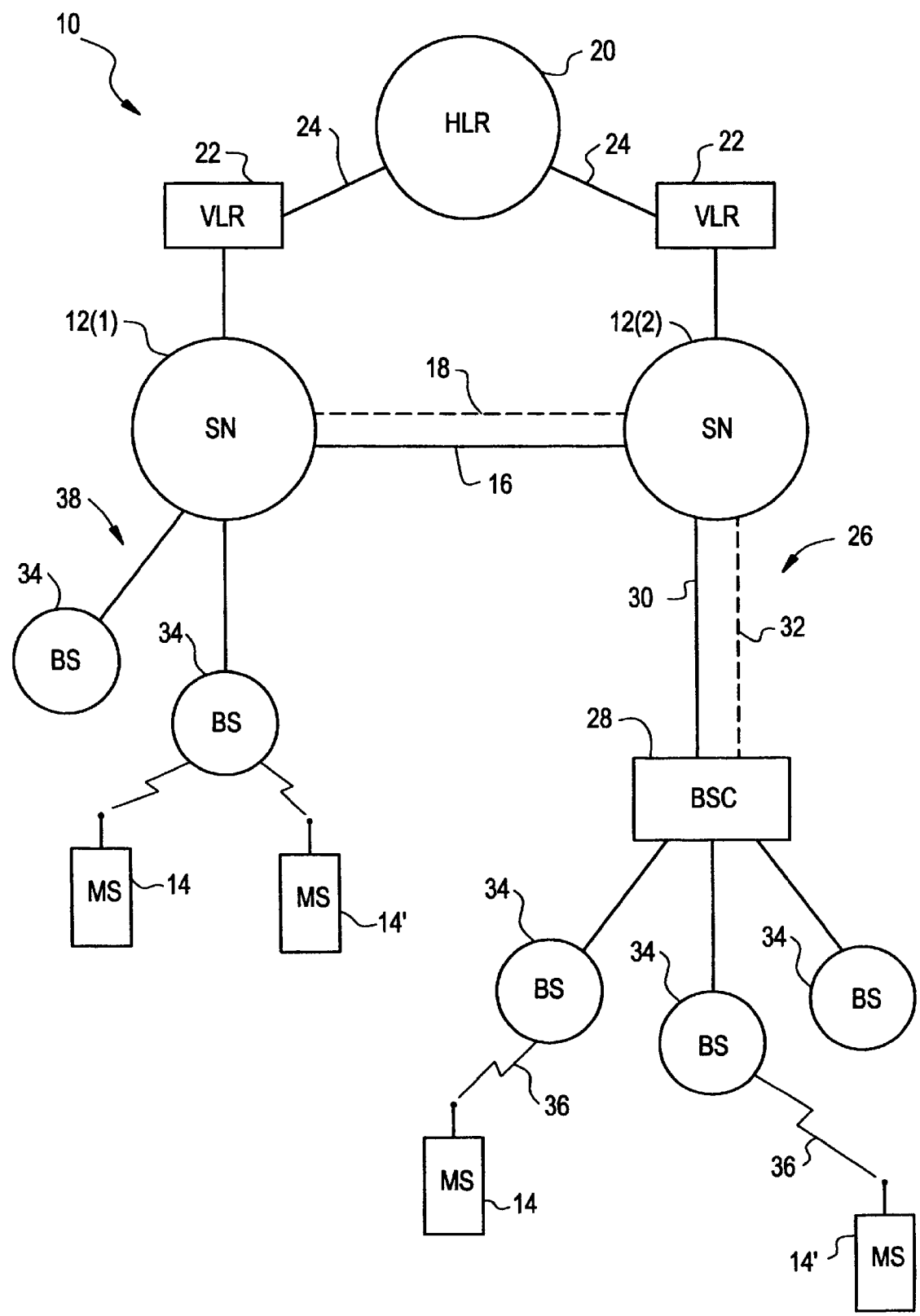
FIG. 1 is a schematic diagram of a cellular telephone network in which the present invention may be implemented.

Reference is now made to FIG. 1, wherein there is shown a schematic diagram of a wireless telephone network 10, providing wireless (cellular) telephone service within a given service area. The network 10 includes a plurality of interconnected switching nodes (SNs) 12 (also referred to as mobile switching centers—MSCs). Although only two switching nodes are shown, it will be understood that the network 10 likely includes many more interconnected nodes. The first and second switching nodes 12(1) and 12(2) may comprise any one of a number of known telecommunication switching devices, including those commonly used and known in the art for providing either digital or analog cellular service to a plurality of mobile stations (MS) 14. The switching nodes 12 are interconnected with each other for communicating via both voice trunks 18 (illustrated with broken lines) and signaling trunks 16 (illustrated with solid lines) providing a known ISUP (or R1 or R2) type connection. The voice trunks 18 provide voice and data communications paths used to carry subscriber communications between the switching nodes 12. The signaling links 16 carry command signals between the switching nodes 12. These signals may be used, for example, in setting up or tearing down voice and data communication links over the voice trunks 18 and controlling the provisions of calling services to the mobile station 14.

Each switching node 12 is also connected to a home location register (HLR) 20 through an associated visitor location register (VLR) 22 by means of a signaling link 24 providing a known mobile application part (MAP) or IS-41 type connection. The switching node 12 and visitor location register 22 may be co-located in a combined MSC/VLR. The home location register 20 stores information relating to the mobile station 14 and their subscriptions comprising location information and service profile information. This information is stored by the home location register 20 in association with the subscriber (directory) number (SNB) and mobile identification number (MIN) (or other protocol for identifying the mobile station) for the mobile station 14. A home location register 20 further supports a plurality of temporary subscriber (directory) numbers (TSNBs) which are assigned and allocated on an as need and temporary basis to be established (defined and connected) roaming mobile stations 14' (i.e., roamers).

In one cellular telephone network implementation illustrated generally at 26, the switching node 12 is further connected to at least one associated base station controller (BSC) 28 via both a signaling link 30 and a voice trunk 32. Only one base station controller 28 is shown connected to switching node 12(2) in order to simplify the illustration. The voice trunk 32 provides a voice and data communications path used to carry subscriber communications between the second switching node 12(2) and its base station controller 28. The signaling link 30 carries command signals between the node 12 and its associated base station controller 28. The signaling link 30 and trunk 32 are collectively commonly referred to in the art as the "A interface". The base station controller 28 is then connected to a plurality of base stations (BS) 34 which operate to effectuate radio frequency communications with proximately located mobile stations 14 over an air interface 36. The base station controller 28 functions in a well-known manner to control this radio frequency communications operation.

In another cellular telephone network implementation, illustrated generally at step 38, the switching node 12(1) is further connected to a plurality of base stations (BS) 34, which operate to effectuate radio frequency communications with proximately located mobile stations 14 over the air interface 36. In this implementation, the functionality provided by the base station controller 28 (see, generally at step 26) is instead provided by the switching node 12.

Although direct communications links (signaling and/or trunk) between the nodes are illustrated in FIG. 1, it is understood by those skilled in the art that the links are not necessarily direct between the illustrated nodes, and may instead pass through many other communications nodes (not shown) of the mobile network, and perhaps even utilize other communications networks (such as the public-switched telephone network—PSTN). Illustration of the links in a "virtual" manner as shown in FIG. 1 is therefore by way of simplification of the drawing and the communications relationship between the various included nodes within the network 10.

Figure 2:
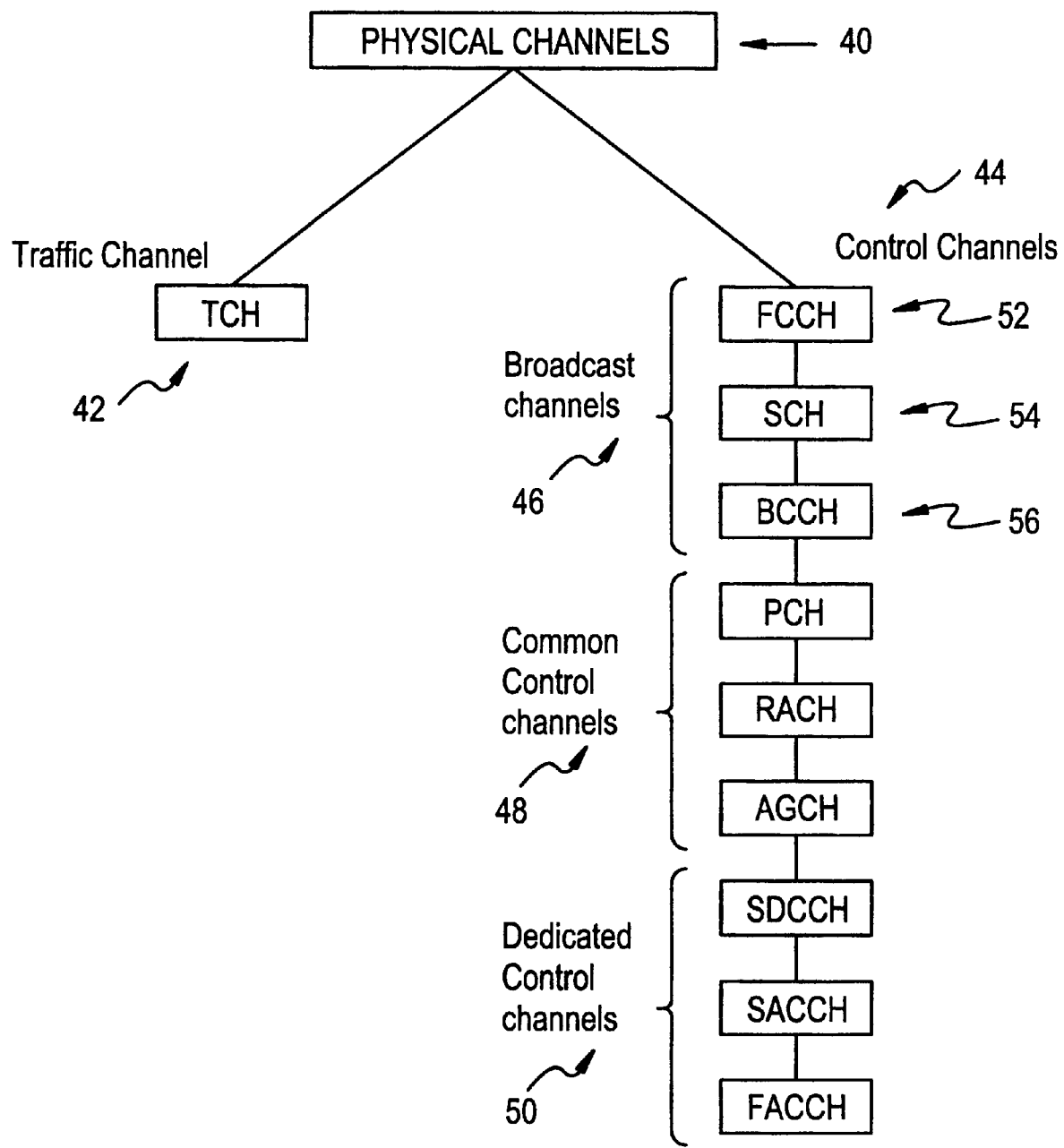
FIG. 2 is an illustration of the logical channels affected by the present invention.

Referring now also to FIG. 2, the communications link 36 includes a number of different logical channels 40 which are separated into two broad categories: traffic channels (TCH) 42 and control channels 44. Traffic channels 42 are utilized by a serving base station controller 28 to communicate call data (e.g., voice data) with a particular mobile station 14 traveling within its coverage area. Control channels 44 are utilized by the serving BCS 28 and base station 34 to communicate other control data necessary to implement the connection of call data with the mobile station 14.

Control channels 44 are further divided into three categories: broadcast channels (BCH) 46, common control channels (CCCH) 48, and dedicated control channels (DCCH) 50. Each of the above three categories are still further subdivided into a number of logical channels for transporting different types of information between the serving BS 34 and a mobile station 14. In the present case, we are concerned with only the BCH 46 so the remainder of the discussion will be directed to BCHs.

The broadcast channels (BCH) 46 are mainly utilized for communicating information from the serving base station 34 to mobile stations 14 traveling within its coverage area (downlink) and include the frequency correction channel (FCCH) 52, synchronization channel (SCH) 54 and broadcast control channel (BCCH) 56. The frequency correction channel (FCCH) 52 carries information for frequency correction of the mobile station 14. The synchronization channel (SCH) 54 carries information for frame synchronization of the mobile station 14 and identification of the base station 34.

The broadcast control channel (BCCH) 56 is used to broadcast general systems information about the cell to all mobile stations 14 located within its location area. For example, the broadcast system information includes data about the network that the mobile station 14 needs to be able to communicate with the network in an appropriate manner. Such information includes cell descriptions, location area identity, neighboring cell description, etc. The carrier frequency for the BCCH channel 56 is always transmitted with nominal output power. If no information is being sent on a time-slot associated with the BCCH carrier frequency, a dummy-burst is sent. These dummy-burst are known as "BCCH filling". The use of BCCH filling makes it possible for mobile stations 14 in neighboring cells to perform valid strength measurements which are utilized for handover decisions to the cell.

Figure 3:
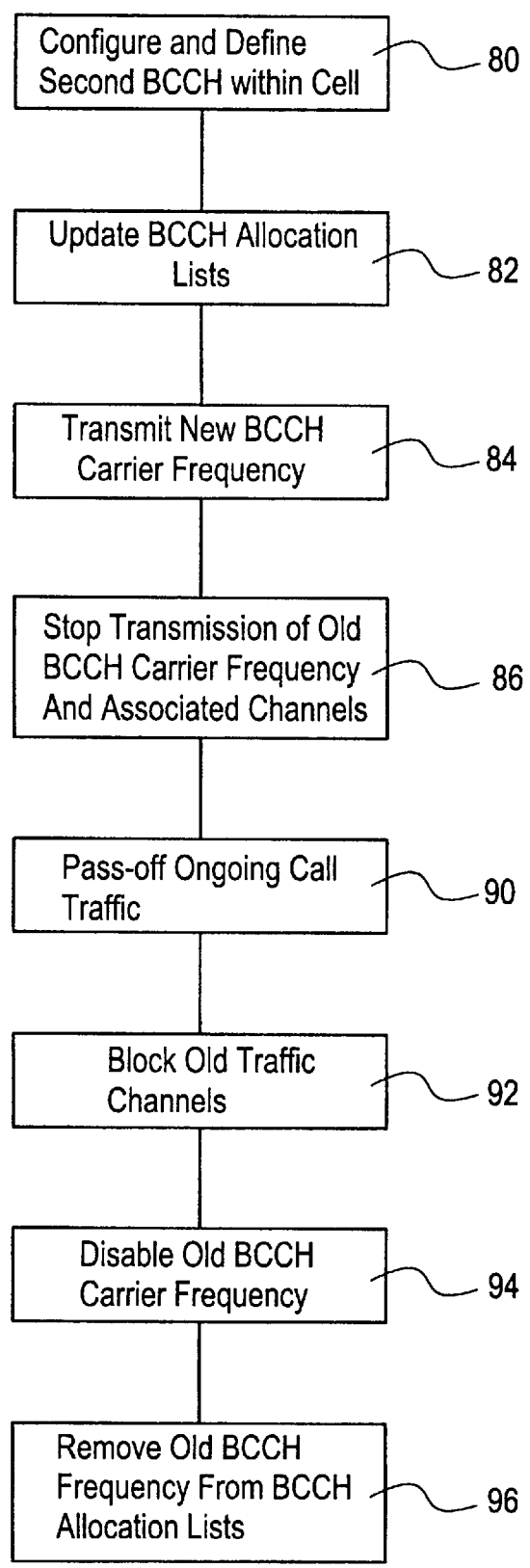
FIG. 3 is a flow diagram illustrating the manner in which a BCCH carrier frequency may be changed without altering the flow of call traffic within the cellular telephone network.

Referring now also to FIG. 3, there is illustrated the manner in which a BCCH carrier frequency for carrying the broadcast control channel data may be changed without disturbing ongoing call traffic in the cell. Initially, the new BCCH carrier frequency is configured and defined at step 80 within the base station controller 28 and base station 34 serving the cell. Additionally, the BCCH allocation (BA) lists (not shown) within neighboring cells are updated at step 82 to reflect the existence of the new BCCH carrier frequency before it is actually transmitted over the downlink. Additional parameters within neighboring cells may also be updated as necessary. The step of updating allocation lists could also be performed prior to configuring the second BCCH within a cell.

The new BCCH carrier frequency may then begin transmitting at step 84 by transmitting the access grant channel (AGCH), paging channel (PCH), random access channel (RACH), frequency control channel (FCCH), synchronization channel (SCH), BCCH filling and the BCCH channel 56 over the new BCCH carrier frequency. At this point, there exist two different BCCH carrier frequencies within the cell, the new frequency and the old frequency. This presents no problems to mobile stations 14 measuring the two different BCCH carrier frequencies since they will treat them as two separate cells. Once the transmission of the new BCCH carrier frequency has begun at step 84, the transmission of the old BCCH carrier frequency and associated channels are discontinued at step 86.

The stoppage of transmission of the old BCCH carrier frequency and associated channels requires the use of timing delays between the various channels to insure that no paging messages or calls are missed or inadvertently dropped. Initially, the frequency correction channel (FCCH) 52, the synchronization channel (SCH) 54 and BCCH filler are discontinued. Next, the BCCH channel 56 is deactivated. This prevents mobile stations in neighboring cells and the serving cell from continuing to have knowledge of the old BCCH carrier frequency. After a selected period of time sufficient to enable all active and idle mobile stations to exclude the old BCCH carrier frequency from their list of six strongest cells and ensure no mobile stations in the idle mode are camping on the old BCCH carrier frequency, the access grant channel (AGCH), paging channel (PCH) and random access channel (RACH) are deactivated.

The FCCH 52 and SCH 54 channels contain, among other things, the Base Station Identity Code (BSIC) parameter.

After these channels are shut down, measurements being sent from mobile stations 14 in the area will no longer contain the old BCCH frequency. This is due to the fact that mobile stations 14 will no longer be able to decode the BSIC parameter or even recognize a signal from the base station 34 since no frequency correction bursts are being transmitted. By ceasing transmission of the FCCH 52 and SCH 54 channels, no new call setups or handovers will be initiated to the cell on the old BCCH carrier frequency. Instead, new call setups and handovers will be initiated over the new BCCH carrier frequency.

Ongoing call traffic on the old BCCH carrier frequency is optionally passed off at step 90 to the new BCCH carrier frequency or other carrier frequencies with available traffic channels in the cell. If stop 90 is not performed eventually as calls are disconnected the BCCH carrier frequency will become free. The traffic channels 42 for the old BCCH carrier frequency are blocked at step 92 if the old BCCH carrier is going to be removed from the cell. If the old BCCH carrier remains with the cell, this is not necessary. Once the old BCCH carrier frequency is freed from traffic it is disabled at step 94. The old BCCH carrier frequency may then be removed at step 96 from the BCCH allocation lists. This completes the change from the old BCCH carrier frequency to the new BCCH carrier frequency without disturbing existing call traffic.

Once the above procedure is completed, the old BCCH carrier frequency may be used as a traffic channel carrier frequency if needed. This procedure enables the BCCH carrier frequency to be changed without any disturbance to ongoing call connections or to idle mode mobile stations 14. Call setups and handovers may also continue to be made to the cell throughout the shift between the BCCH carrier frequencies. By allowing system operators to change the BCCH carrier frequency for a cell, without any disturbance to existing call traffic, operators may provide flexible frequency plans and reduce system operating costs.

Although a preferred embodiment of the method and apparatus of the present invention has been illustrated in the accompanying Drawings and described in the foregoing Detailed Description, it is understood that the invention is not limited to the embodiment disclosed, but is capable of numerous rearrangements, modifications, and substitutions without departing from the spirit of the invention as set forth and defined by the following claims.

What is claimed is:

1. A method for establishing a new BCCH carrier frequency within a cell comprising the steps of:

establishing a second BCCH carrier frequency within a cell having a first BCCH carrier frequency;

transmitting a BCCH data on the first BCCH carrier frequency during a first time period;

transmitting the BCCH data on the first and the second BCCH carrier frequencies during a second time period; and discontinuing transmission of the BCCH data on the first BCCH carrier frequency in a time delayed manner during a third time period such that the BCCH data is only transmitted on the second BCCH carrier frequency after the third time period.

2. The method of claim 1 wherein the step of establishing the second BCCH carrier frequency further includes the steps of:

configuring and defining the BCCH carrier frequency within the cell; and updating the BCCH allocation lists in neighboring cells with the second BCCH carrier frequency.

3. The method of claim 1 wherein the step of transmitting the BCCH data on the first and the second BCCH carrier frequencies further includes the step of transmitting BCCH filling on the second BCCH carrier frequency.

4. The method of claim 1 wherein the steps of discontinuing further includes the step of stopping transmission of BCCH filling on the first BCCH carrier frequency.

5. The method of claim 1, further including the step of blocking traffic channels of the first BCCH carrier frequency if the first BCCH carrier frequency will no longer be used within the cell.

6. The method of claim 1, further including the step of handing over ongoing calls from the first BCCH carrier frequency to another carrier if the first BCCH carrier frequency will no longer be used within the cell.

7. The method of claim 6 wherein the other carrier comprises the second BCCH carrier frequency.

8. The method of claim 1, further including the step of disabling the first BCCH carrier frequency.

9. The method of claim 1, further including the step of using the first BCCH carrier frequency as a new TCH channel carrier frequency.

10. A method for establishing a new BCCH channel carrier frequency within a cell without disturbing ongoing call traffic, comprising the steps of:

establishing a second BCCH carrier frequency within a cell having a first BCCH carrier frequency;

transmitting BCCH filling on the second BCCH carrier frequency during a time period wherein the first BCCH carrier frequency is still active;

stopping transmission of the FCCH, BCCH, CCCH, SCH and BCCH filling on the first BCCH carrier frequency in a time delayed manner such that selected channels are deactivated at different times over a selected time period; and disabling the first BCCH carrier frequency.

11. The method of claim 10 wherein the step of establishing the second BCCH carrier frequency further includes the steps of:

configuring and defining the BCCH carrier frequency within the cell; and updating the BCCH allocation lists in neighboring cells with the second BCCH carrier frequency.

12. The method of claim 10, wherein the step of stopping further includes the steps of:

stopping transmission of the FCCH, SCH and BCCH filling at a first selected time;

stopping transmission of the BCCH at a second selected time; and stopping transmission of the CCCH at a third selected time.

13. The method of claim 10, further including the step of using the first BCCH carrier frequency as a new TCH channel carrier frequency.

14. A base station serving a cell within a cellular communications network, comprising:

a transceiver for transmitting and receiving carrier frequencies;

means for controlling the transceiver to define and transmit a first and a second BCCH carrier frequency, wherein the means for controlling enables transmission of the first BCCH carrier during a first time period, transmission of both the first and the second BCCH carrier frequency during a second time period and transmission of only the second BCCH carrier frequency after a third time period, wherein the means for controlling stops transmission of data associated with the first BCCH carrier frequency in a time delayed manner.

15. The base station of claim 14 wherein the controller further hands off ongoing call traffic from the first BCCH carrier frequency to another carrier frequency.

16. The base station of claim 14 wherein the controller disables the first BCCH carrier frequency.

* * * * *